United States Patent Office 2,820,046
Patented Jan. 14, 1958

2,820,046

OXIDATION OF FATTY ACIDS

James S. Mackenzie, Morristown, N. J., and Chester S. Morgan, Jr., Corpus Christi, Tex., assignors to Celanese Corporation of America, New York, N. Y., a corporation of Delaware No Drawing. Application September 10, 1954
Serial No. 455,359

14 Claims. (Cl. 260—406)

This invention relates to the oxidation of fatty acids and relates more particularly to the oxidation of unsaturated long chain fatty acids such as oleic acid.

An important object of this invention is to provide a novel process for the oxidation of unsaturated long chain fatty acids.

A further object of this invention is to provide a novel process for the oxidation of unsaturated long chain fatty acids in the liquid phase with a gas containing molecular oxygen as the oxidizing agent and in the presence of propanol as a solvent.

Another object of this invention is the provision of a new and efficient process for the oxidation of oleic acid to produce azelaic and pelargonic acids.

Other objects of this invention will be apparent from the following detailed description and claims.

When unsaturated long chain fatty acids are oxidized, the oxidation reaction tends to split the fatty acid chain at its point of unsaturation with the production of a monobasic acid and a dibasic acid. For example, in the oxidation of oleic acid there is obtained a mixture of pelargonic acid and azelaic acid which are valuable commercial products.

According to one feature of the present invention, it has been discovered that when the oxidation of unsaturated long chain fatty acids is carried out with a gas containing molecular oxygen as the oxidizing agent and in the presence of propanol as a solvent, the oxidation proceeds rapidly and with a high yield of monobasic and dibasic acids produced by splitting the fatty acid chain at its point of unsaturation. The use of propanol as a solvent in this process is a highly important factor in obtaining the maximum yield of the desired products. When other solvents such as benzene, toluene or acetic acid are employed, the yield of the desired products is considerably reduced and, in some cases, the speed with which the oxidation proceeds is also reduced. For example, when acetic acid is substituted for propanol the rate of production of azelaic acid, as expressed in pounds of azelaic acid produced per pound of oleic acid consumed per hour of reaction time, is reduced by about 25%. The special utility of propanol is surprising since it is known that propanol is an oxidation inhibitor in many cases.

In carrying out the oxidation process of this invention there is also produced a substantial amount of a partial oxidation product comprising a saturated long chain fatty acid having the same number of carbon atoms as the starting acid and having two hydroxyl groups substituted on adjoining carbon atoms at the original point of unsaturation. Thus, 9,10-dihydroxystearic acid is produced by the partial oxidation of oleic acid. According to one aspect of this invention, this dihydroxy acid may be further oxidized in such a manner as to split the carbon chain at the point between the two hydroxyl-substituted carbon atoms to give a high yield of the same monobasic and dibasic acids as are obtained by the initial oxidation of the unsaturated long chain fatty acid so that the total yield of these monobasic and dibasic acids is further increased. The further oxidation of the partial oxidation products is effected by adding the same to a liquid body of the long chain fatty acid which is being oxidized by means of a gas containing molecular oxygen.

According to another aspect of this invention, when propanol is used as the solvent for the oxidation of oleic acid, oxidation of a portion of the propanol takes place, producing propionic and acetic acids. The molar ratio of the propionic acid to acetic acid in the products of this reaction is much larger than 1:1, e. g. 6.7:1.

The unsaturated long chain fatty acids to which the process of this invention is applicable are monocarboxylic acids containing at least about ten, preferably not more than twenty-four, carbon atoms and also containing at least one ethylenically unsaturated linkage, there being no ethylenic linkages which are conjugated with the carbonyl group of the carboxylic acid radical. Examples of acids falling within this class are oleic acid, with which the process of this invention is especially useful, palmitoleic, petroselinic, erucic and linoleic acids. The acids may be supplied to the process in commercially pure form, or materials containing such acids, such as foots oil, or the like, may be oxidized directly without first separating the acids therefrom.

The oxidation of the unsaturated long chain fatty acid is carried out conveniently by passing air, or other gas which contains molecular oxygen, through a solution of said fatty acid in propanol in the presence of an oxidation catalyst comprising a metal having at least two valence states such as, for example, a catalyst containing cobalt, manganese, copper or chromium. Especially valuable results are obtained when a cobalt salt which is soluble in the reaction mixture, such as cobalt acetate or cobalt naphthenate, is employed as the catalyst since it exhibits a high catalytic activity and retains its catalytic activity substantially unchanged for long periods of time. When small amounts of cobalt catalyst are used the rate of reaction increases as the proportion of catalyst is increased, but when the concentration of cobalt in the reaction mixture is raised above about 100 parts per million no further increase in reaction rate is observed. For best results, the concentration of cobalt is in the range of about 50 to 500 parts per million.

While some oxidation of the unsaturated long chain fatty acids to desired products will take place over a fairly wide range of temperatures of from about 25 to 150° C., it is preferred to operate at temperatures of between about 80 and 90° C. for best results. At temperatures above about 90° C. considerable quantities of unwanted carbonyl compounds are produced and the tendency for the oleic acid to polymerize is increased. Below 80° C. the reaction becomes relatively sluggish and time consuming.

When propanol is employed as a solvent the ratio of oleic acid to propanol in the reaction mixture may be varied widely, e. g. from about 2:1 to about 1:10, ratios of about 1:2 or 1:3 to about 1:5 being preferred.

Advantageously, the oxidation reaction is carried out until about 50 to 95%, preferably about 60 to 80%, of the long chain unsaturated fatty acid has been oxidized. Reaction to this extent occurs at a relatively high rate and produces sufficient amounts of the desired oxidation products to facilitate the recovery thereof from the reaction mixture.

After the oxidation reaction has been carried out to the desired extent the products of reaction may be isolated in any suitable manner. In one convenient process, the solvent is removed by distillation, together with acetic and propionic acids formed in the reaction, after which any esters present are saponified, as by refluxing the product with aqueous sodium hydroxide. The mixture is then acidified, e. g. with sulfuric acid, to produce the free carboxylic acids, and the acidified mixture is extracted with ether. The addition of the ether results in the formation of precipitate of the dihydroxy acid and an ether solution of the other carboxylic acids present. After evaporation of the ether, and some propionic acid, from this solution the ether-soluble carboxylic acids are reacted with ethyl or methyl alcohol, and the resulting esters are then separated from one another by fractional distillation under subatmospheric pressure. In a variation of this procedure, after the ether is distilled off the remaining acid mixture is fractionally distilled to recover the pelargonic acid therefrom and the azelaic acid is recovered by extracting the resulting distillation residue with hot water followed by cooling or evaporating the hot aqueous solution thus obtained in order to crystallize the azelaic acid therefrom.

As previously stated, according to one feature of this invention the dihydroxy acid produced by the oxidation of the unsaturated acid may be further oxidized, so as to split the carbon chain at the point between the hydroxyl substituted carbon atoms, by adding said dihydroxy acid to a liquid body of the unsaturated long chain fatty acid which is being oxidized by means of the gas containing molecular oxygen. Thus, when 9,10-dihydroxystearic acid is added in minor amounts to a solution of oleic acid in a solvent, e. g. propanol, which solution is undergoing oxidation at an elevated temperature by the bubbling of air therethrough in the presence of a cobalt catalyst, the 9,10-dihydroxystearic acid is oxidized almost quantitatively, giving excellent yields of azelaic and pelargonic acids.

The results obtained by addition of the dihydroxy acid to the liquid body of unsaturated long chain fatty acid are very surprising in view of the usual resistance of such dihydroxy acids to liquid phase oxidation by molecular oxygen. This resistance to oxidation is shown by the following facts: When it is attempted to oxidize 9,10-dihydroxystearic acid in the absence of oleic acid by passing air through a heated liquid body of said dihydroxy acid in the presence of a cobalt catalyst and a solvent, very little oxidation occurs, regardless of whether the solvent is acetic acid, benzene or propanol. When 5% of the dihydroxy acid is added to oleic acid and the resulting mixture is then treated by heating the same and passing air therethrough in the presence of cobalt catalyst, it is found that the presence of the dihydroxy acid causes almost complete inhibition of the oxidation; furthermore, addition of benzoyl peroxide to this system causes only temporary reaction with oxygen, which reaction terminates as the peroxide is exhausted.

In contrast to the results described in the preceding paragraph, when the dihydroxy acid is added in small proportions to oleic acid which is undergoing oxidation the rate of oxidation decreases temporarily on the addition of the dihydroxy acid but soon resumes its normal value. Advantageously, the amount of the dihydroxy acid which is added is such that at no time is the concentration thereof more than about 10%, preferably not more than 5%, based on the weight of the liquid reaction mixture, and the reaction is carried out in the presence of a solvent, such as benzene or propanol, preferably the latter. Thus, in one procedure the amount of the dihydroxy acid added initially to the body of oleic acid and solvent undergoing oxidation is about 1 to 5%, while the amount used in subsequent additions is increased until after the reaction has been under way for some time the concentration of dihydroxy acid in the reaction mixture is about 10%.

After the 9,10-dihydroxystearic acid, pelargonic acid, azelaic acid, propionic acid and acetic acid are removed from the reaction products there remains a residual mixture containing unreacted oleic acid and polymerization products. If desired, this residual mixture may be subjected to further oxidation to produce further quantities of pelargonic and azelaic acids. For example, this further oxidation may be carried out by passing an oxygen-containing gas through a solution of the residual mixture at an elevated temperature in the presence of an oxidation catalyst. However, the residual mixture oxidizes at a considerably slower rate than the original oleic acid.

In carrying out the oxidation of oleic acid at the preferred temperature of 80 to 90° C. it is found that the oxidation reaction does not start immediately. On the contrary, the oxygen-containing gas must be passed through the heated oleic acid-containing reaction mixture for an appreciable period of time before oxidation begins. The length of this induction period is reduced by an increase in the temperature. In fact, at temperatures of about 150° C. there is no induction period. Accordingly, if desired, the reaction may be started at a temperature above about 90° C., e. g. about 150° C., and after the reaction has begun the temperature may be reduced to the desired operation range. Alternatively, or in addition to the use of higher temperatures for starting the reaction, the reaction may be begun in the presence of a minor amount, e. g. 5 to 20%, of the reaction products obtained by a previous oxidation of the same materials.

The following examples are given to illustrate this invention further:

Example I

A body of liquid, 18 inches high, comprising a 35% (by weight) solution of technical (95%) oleic acid in n-propanol, is maintained at a temperature of 86° C. in a reactor. The solution also contains dissolved therein 0.042% by weight of cobalt, in the form of cobalt naphthenate. From the bottom of the reactor very fine bubbles of air are passed into and through said solution at the rate of about 0.3 cubic feet per minute, measured at standard conditions, per square foot for 72 hours. The gases leaving the reactor are first passed through an icewater reflux condenser and then vented to the atmosphere. At the end of the 72 hour period the reaction mixture is separated into its components. It is found that 60% of the oleic acid has been consumed in the reaction. For each pound of oleic acid consumed there are obtained 0.30 pound of azelaic acid (representing an efficiency of 46%, calculated on the basis that the technical oleic acid is 100% oleic acid), 0.13 pound of pelargonic acid (representing an efficiency of 23%) and 0.21 pound of 9,10-dihydroxystearic acid (representing an efficiency of 19%).

Example II

Example I is repeated except that the concentration of oleic acid is 34%, the temperature is 88° C. and the reaction time is 120 hours. For each pound of oleic acid consumed there are produced 0.32 pound of azelaic acid, 0.13 pound of pelargonic acid and 0.28 pound of 9,10-dihydroxystearic acid.

Example III

Example I is repeated except that the temperature is 85° C., no catalyst is present, and the reaction time is 240 hours. For each pound of oleic acid consumed there are produced 0.30 pound of azelaic acid, 0.18 pound of pelargonic acid and 0.12 pound of 9,10-dihydroxystearic acid.

Example IV

Example I is repeated except that the temperature is 81° C., the concentration of oleic acid is 25%, the concentration of cobalt is 0.056%, the reaction time is 140 hours, and, after active oxidation of the mixture has begun, 1.05 moles of 9,10-dihydroxystearic acid are added per mole of oleic acid originally present. The 9,10-dihydroxystearic acid is added in small increments over the entire reaction period, in such a manner that the instantaneous concentration thereof in the reaction mixture never exceeds 5% by weight. 65% of the oleic acid is consumed in the reaction. The reaction products contain 0.43 pound of azelaic acid, and 0.28 pound of pelargonic acid, per pound of 9,10-dihydroxystearic acid and oleic acid consumed.

It is to be understood that the foregoing detailed description is given merely by way of illustration and that many variations may be made therein without departing from the spirit of our invention.

Having described our invention what we desire to secure by Letters Patent is:

1. Process for the production of mono- and dicarboxylic acids which comprises reacting oxygen with a solution of an unsaturated higher fatty acid containing from 10 to 24 carbon atoms, in which the unsaturation is ethylenic, and propanol, the ratio of said higher fatty acid to propanol being from about 2:1 to about 1:10, at a temperature of about 25 to 150° C.

2. Process for the production of azelaic and pelargonic acids, which comprises reacting oxygen with a solution of oleic acid and propanol, in which the ratio of oleic acid to propanol is from about 2:1 to about 1:10, at a temperature of about 25 to 150° C.

3. Process as set forth in claim 2 and in which said reaction is effected by passing a free oxygen-containing gas through a heated liquid body of said solution.

4. Process as set forth in claim 2 in which said reaction is effected in the presence of a catalyst for the oxidation of oleic acid with oxygen.

5. Process as set forth in claim 2 in which said reaction is effected at temperature of about 80 to 90° C.

6. Process as set forth in claim 2 in which said reaction is effected in the presence of a dissolved cobalt salt, the concentration of cobalt being about 50 to 500 parts per million.

7. Process for the production of azelaic and pelargonic acids which comprises reacting oxygen with a liquid body of oleic acid at a temperature of about 25 to 150° C., and, while said oleic acid is being oxidized, adding to said liquid body 9,10-dihydroxystearic acid, while maintaining in said liquid body, a minor concentration, insufficient to stop said oxidation reaction, of said 9,10-dihydroxystearic acid.

8. Process for the production of azelaic and pelargonic acids which comprises reacting oxygen with a liquid body of oleic acid at a temperature of about 25 to 150° C., and, while said oleic acid is being oxidized, adding to said liquid body 9,10-dihydroxystearic acid, while maintaining in said liquid body a concentration, insufficient to stop said oxidation reaction, of at most about 10% of said 9,10-dihydroxystearic acid during said reaction.

9. Process as set forth in claim 7 in which said reaction is effected by passing a free oxygen-containing gas through said liquid body.

10. Process as set forth in claim 9 and in which said 9,10-dihydroxystearic acid is added gradually to said liquid body.

11. Process as set forth in claim 7 in which the temperature of said liquid body is about 80 to 90° C.

12. Process as set forth in claim 7 in which said liquid body contains a catalyst for the oxidation of oleic acid with oxygen.

13. Process as set forth in claim 12 in which said catalyst is a dissolved cobalt salt.

14. Process as set forth in claim 13 in which said liquid body comprises a solution of oleic acid and propanol.

References Cited in the file of this patent

UNITED STATES PATENTS

| | | |
|---|---|---|
| 2,292,950 | Loder et al. | Aug. 11, 1942 |
| 2,572,892 | Swern et al. | Oct. 30, 1951 |

OTHER REFERENCES

Knight et al.: "Journal of the American Oil Chemists' Society," vol. 31 (1954), pages 93–96.